Oct. 28, 1941. P. W. GREEN 2,260,791
HEATING UNIT
Filed May 16, 1939 2 Sheets-Sheet 1
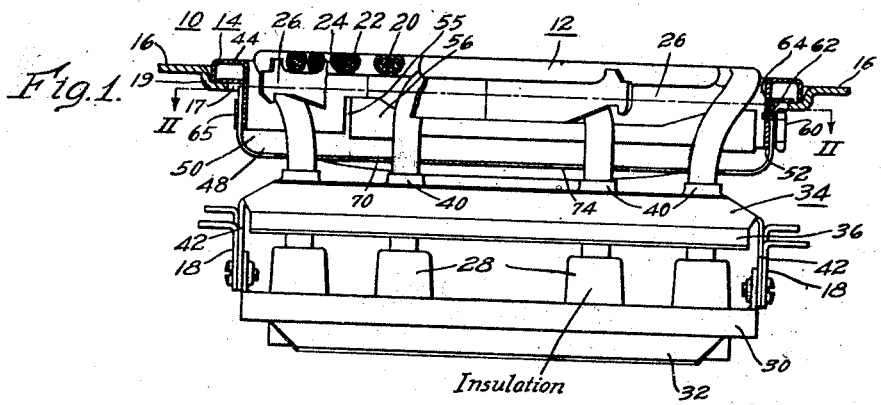
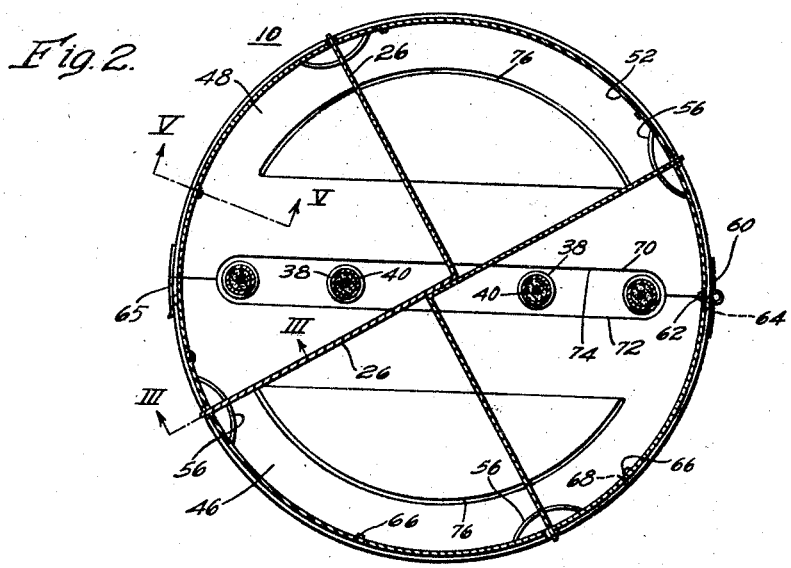
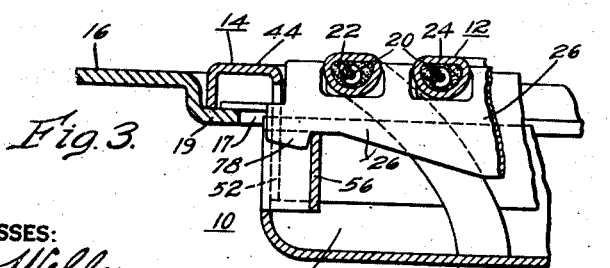
INVENTOR
Paul W. Green.
BY
ATTORNEY

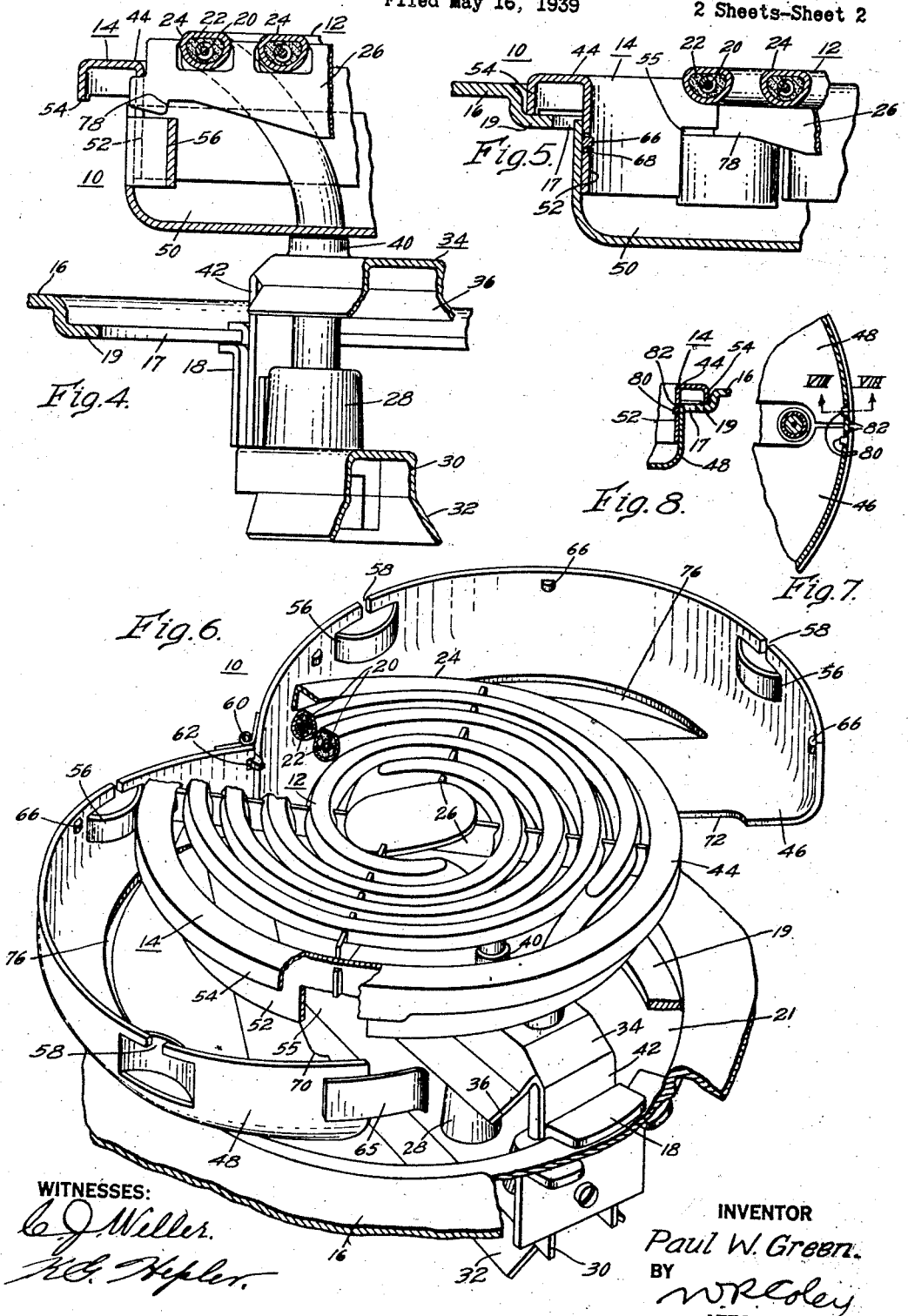

Patented Oct. 28, 1941

2,260,791

UNITED STATES PATENT OFFICE 2,260,791

HEATING UNIT

Paul W. Green, Mansfield, Ohio, assignor to Westinghouse Electric & Manufacturing Company, East Pittsburgh, Pa., a corporation of Pennsylvania Application May 16, 1939, Serial No. 273,859

4 Claims. (Cl. 219—37)

My invention relates to heating units, and more particularly to a range surface unit or the like having a removable supporting pan structure. This application is an improvement over W. J. Russell's copending application Serial No. 264,775, filed March 29, 1939, and is related to my copending application Serial No. 273,860, filed May 16, 1939, both assigned to the assignee of the present application.

An object of my invention is to provide a heating unit having a heating element and a removable pan structure including a ring-like supporting member and a plurality of removable body portions.

A further object of my invention is to provide a supporting pan structure for a heating element including a plurality of removable bottom portions which are adapted to support the heating element during the normal operation thereof.

A further object of my invention is to provide a supporting pan structure including a ring-like supporting member and a plurality of bottom portions adapted to be retained substantially functionally integrally with the ring-like member and to support such element during the normal operations thereof.

Another object of my invention is to provide a heating unit including an element, a removable pan structure including a ring-like member and a plurality of removable bottom portions, and means for retaining the unit in an elevated position above the surface of the platform, said removable bottom portions being adapted to be retained substantially functionally integral with the member during the normal operations of the unit and adapted to be readily removed from the ring-like member and the heating element when the unit is in its elevated position.

A still further object of my invention is to provide an inexpensive, rugged, dependable supporting pan structure for a heating unit which includes means for supporting a heating element thereof when the unit is in its normal operating position, and which can be easily removed therefrom to permit thorough cleaning thereof.

Other objects of my invention will either be pointed out specifically in the course of the following description of a device embodying my invention, or will be apparent from such description.

In the accompanying drawings,

Figure 1 is a sectional view of a heating unit embodying my invention resting upon a supporting platform in its normal operating position;

Fig. 2 is a sectional view taken along the line II—II of Fig. 1, with portions thereof omitted;

Fig. 3 is an enlarged fragmentary view taken along the line III—III of Fig. 2, with the unit resting upon a supporting platform in its normal operating position;

Fig. 4 is a view similar to Fig. 3 illustrating the unit in an elevated position;

Fig. 5 is an enlarged sectional view taken along the line V—V of Fig. 2 with the unit resting upon the supporting platform;

Fig. 6 is a perspective view of the heating unit shown in Fig. 1 in its elevated position, with the heating element and pan structure thereof retained above the supporting platform and with the supporting pan structure partially removed from the heating element;

Fig. 7 is a fragmentary sectional view similar to Fig. 2 illustrating a modified hinging arrangement; and Fig. 8 is a sectional view taken along the line VIII—VIII of Fig. 7.

Referring to the accompanying drawings, in which like reference characters indicate like parts in the several figures, I show a heating unit 10 including a heating element 12, a supporting structure 14 adapted to support the unit 10 on a range platform, hotplate surface, or the like, 16, during the normal operation of such unit and an elevating supporting structure 18 adapted to support the unit 10 in an elevated position above the platform when it is desired to clean such unit.

The heating element 12 in this instance comprises an open grid formed of two sheathed members arranged in a spiral in a well-known manner. The sheathed members each comprise a resistor 20 embedded within a suitable insulating material 22 and surrounded by a metal sheath 24 in a well-known manner. The insulating material 22 is preferably magnesium oxide or the like and may be positioned within the metallic sheath or envelope 24 in a powdered form. The metallic sheath is formed of any suitable material which will permit the heating element 12 to operate satisfactorily at a high temperature corresponding to red heat.

The sheath members are formed into two separate substantially concentric spirals and may be of either similar or varying wattages. The substantially concentric spirals are mounted in and attached to suitable radially extending transversely grooved supporting arms 26 in a well known manner. These arms are adapted to support the heating element 12 within the pan structure 14 in a manner hereinafter described.

It is to be understood that the heating element 12 described herein and illustrated in the accompanying drawings, is used primarily for illustrative purposes, and that other suitable heating elements may be used in lieu thereof.

The ends of the tubular sheathed members extend downwardly from the main plane of the heating element 12 and terminate within suitable refractory insulating bushings 28. Suitable terminals (not shown) are located at the lower ends of the sheathed members within the bushings 28 to afford means for connecting the heating element 12 to a supply circuit (not shown). The bushings 28 are attached to a terminal block 30, which in this instance comprises an elongated inverted channel-like member having outwardly and downwardly sloping sides 32. The channel member is formed from any suitable metallic sheet material and has formed therein a plurality of apertures along the upper surface thereof for permitting the passage and retention of the bushings 28.

A terminal shield 34, preferably of metallic material, is positioned intermediate the heating element 12 and the terminal block 30 and extends substantially diametrically across the heating unit 10. The terminal shield 34 in this instance, is substantially an elongated inverted channel having outwardly and downwardly sloping sides 36 and a plurality of apertures 38 located within the upper surface thereof to afford suitable passage for the depending ends of the heating element 12. Upwardly extending collars 40 may be located about the apertures 38 to form small vertical sleeves through which the depending ends of the element pass. These collars 40 are wedged tightly against the metallic sheath heating members to prevent passage of the liquid along the surface of the depending ends of such members, and to retain the members in position as a functionally integral heating element.

Depending end portions 42 are, in this instance, located at either end of the terminal shield 34 to afford means for rigidly attaching the terminal block 30 thereto. However, it is to be understood that the terminal shield 34 and terminal block 30 may be rigidly attached together or to the heating element 12 in any other desired manner.

It is, therefore, obvious that the heating element 12, terminal shield 34 and terminal block 30, being rigidly attached together, will move as a functionally integral unitary structure substantially as hereinafter described.

The sloping sides 36 of terminal shield 34 direct any spillage or sloppage which may pass through the open heating element 12 outwardly away from the lower or terminal ends of the heating element 12. This structure thus adequately protects the terminals and insulating bushings 28 from any extraneous matter which might pass down through the unit and along the depending ends of the sheathed members thereof.

The pan structure 14 comprises a ring-like supporting member 44 and a plurality of removable bottom portions 46 and 48 which cooperate to form an open pan-like vessel having a depressed central portion 50. The ring-like member 44 is formed from preferably a single sheet of suitable metallic material into a functionally integral structure having a depending sleeve or cylinder portion 52 having a relatively small height and an overhanging lip or flange portion 54 located about the upper periphery thereof for providing means for supporting the ring-like member 44 upon the platform 16. Such member 44 has a diameter slightly less than the diametrical distance across the radially extending supporting arms 26 of the heating element 12 so as to rest on said arms when the unit 10 is elevated above its normal operating position (see Fig. 4). A plurality of upwardly extending notches 55 may be formed within the depending sleeve or cylindrical portion 52 to permit the ready access of lugs 56 associated with the bottom portions, as hereinafter described.

The bottom portions 46 and 48, there being two in this instance, comprise a substantially horizontally disposed semi-circular bottom and a semi-cylindrical upwardly extending side. Accordingly, the bottom portions may be classified as substantially half dish-shaped members. A plurality of inwardly extending lugs 56 are formed within or rigidly attached to the sides of the bottom portions to afford means for retaining the heating element 12 through the cooperation of the radially extending arms 26, when the unit is in its normal operating position, as hereinafter described.

The lugs 56 may be formed substantially in line with the top surface of the semi-cylindrical sides or may be located somewhat below such surface, as illustrated in Figs. 3, 4 and 6. With the lugs 56 located below the top surface of the sides, it is necessary to have a vertically extending notch 58 located within the side walls substantially midway of the lugs 56 to afford means whereby the outer ends of the radially extending arms 26 may move from a normal position resting upon the lugs, when the unit is in its normal operating position (see Fig. 3), to an upper position where they support or carry the ring-like supporting member, when the unit is in an elevated position above the platform 16 (see Fig. 4).

The bottom portions 46 and 48 are, in this instance, hinged together by means of any suitable hinging structure 60 so as to permit such portions to be removably located about the heating element 12 and in cooperation with the ring-like member 44. The hinge structure is rigidly attached to the upstanding side walls of the half dish-shaped bottom portions 46 and 48.

An inwardly extending key or wedge shaped fulcruming pin 62 is located substantially in line with the hinge structure 60 and is adapted to cooperate with an aperture 64 in the depending sleeve portion 52 of ring-like member 44 as the bottom portions are cooperatively located about the ring-like member (see Figs. 2 and 6). The pin 62 is, in this instance, a part of the hinge structure 60. However, it may be formed integral with or attached to either or both bottom portions.

With the key 62 engaged within the aperture 64, the bottom portions 46 and 48 may be rotated about the hinge structure 60 so as to engage the depending side of the ring-like member. Suitable inwardly extending wedge-like keying members 66 are rigidly attached to or formed within the side portions of the movable bottom portions 46 and 48. These keys 66 are adapted to cooperate with the depending sleeve portion 52 of the ring-like member 44 by passing through suitable cooperating slots 68 positioned therethrough as the movable bottom portions 46 and 48 are rotated about the hinge structure 60 and engage the ring-like member 44 (see Figs. 2 and 6). This cooperation of the key-like member 66 within the slots 68 as the movable portions 46 and 48 are moved into their cooperative engagement with the ring-like member 14, prevents the movable bottom portions 46 and 48 from being moved vertically with respect to the ring-like member 14.

The inwardly extending key members 66 thus cooperate with the apertures 68 in the depending side portion of the ring member 44 to form a functionally integral structure between the bottom portions 46 and 48 and the ring-like member 44, and to prevent any relative movement therebetween.

A suitable latching device 65 is located substantially diametrically opposite the hinging structure 60 to cooperate with the hinged half-pan structures 46 and 48 and to latch them together as they are positioned about the ring-like member 44. The device 64 is rigidly attached to, say, one half-pan structure 48 and cooperates with the second structure 46, in a well-known manner. The cooperation of the keys 66 with notches 68 and the cooperation of latching means 64 with the two half-pan structures 46 permits the half-pan structures 46 and 48 to be keyed with and retained against the depending sleeve portion 52 of the ring-like member 44 so as to insure a functionally integral pan structure 14.

Elongated notches 70 and 72 are formed or cut within the respective cooperating edges of the bottom portions 46 and 48 so as to cooperate and form an elongated aperture 74 in the bottom of the pan structure 14 when such bottom portions are cooperatively engaged with the ring-like member 44. The elongated aperture 74 thus permits the bottom portions to be functionally integrally attached to the ring-like member when associated with the heating element 12 without binding action with the depending ends of such heating element 12.

Suitable apertures 76, arcuate in shape, in this instance, are located within the bottom portions 46 and 48, and parts of the bottoms of such portions are bent downwardly to provide louvers to permit the free passage of any extraneous matter which might pass beneath the heating element 12. The bottom portions 46 and 48 are slightly inclined or tapered towards the apertures 64 to more readily guide such extraneous matter towards the apertures. The bottom portions 46 and 48, in cooperation with the terminal shield 34, thus prevent any of the sloppage or extraneous matter passing beneath the heating element 12 from coming in contact with the terminal ends of the tubular heating members.

A tapered notch 78 is located on the lower surface of the ends of the radially extending supporting arms 26. These notched ends 78 are adapted to extend downwardly within lugs 56 in the pan structure 14 when the element 12 is retained by the pan structure 14 in its normal operating position. The notched ends 78 thus engage the lugs 56 and prevent the outward movement of the movable bottom portions 46 and 48. The radially extending arms 26 thus, through the cooperation of the lugs 56 and notched portions 78, lock the supporting pan portions 46 and 48 together and prohibit any relative horizontal movement between the heating element 12 and the pan structure 14.

When assembling the heating unit 10, including the heating element 12, functionally integral terminal shield 34 and terminal block 30, the ring-like member 44 may be located about the element 12 and upon the radial supporting arms 26. The hinged bottom portions 46 and 48 may then be positioned in engagement with such ring-like member 44 with the pin 62 passing through the aperture 64, whereupon the half-pan bottom portions may be hinged about and retained in engagement with the ring-like member as a functionally integral structure. The bottoms of the bottom portions 46 and 48 will thus be located intermediate the heating element 12 and the terminal shield 34. The terminal shield will be located substantially in line with the elongated aperture 74 and cooperates with the bottom portions to prevent any sloppage or extraneous matter passing beneath the heating element from coming in contact with the terminal ends of the heating element.

The unit 10 may then be located within the aperture 17 in the platform 16 whereupon the overhanging lip 54 of ring-like member 44 rests upon the ledge 19 adjacent the aperture. The radially extending arms 26 then rest upon the lugs 56 and retain the element 12 slightly above the surface of the platform 16. In addition, the tapered notched ends 78 of the arms 26 cooperate with the lugs 56 to position the unit 10 as a functionally integral structure.

When it is desired to clean the unit 10 embodying my invention when it is positioned upon the platform 16 in its normal operating position, an operator merely grasps the heating element 12 and lifts the unit upwardly through the aperture 17. The arms 26 then engage the ring-like member 44 and lift the pan structure 14 upwardly with the unit. The unit is lifted upwardly beyond the platform 16 until the elevating supporting structures 18 partially pass through a notch 21 in ledge 19 and is positioned so as to cooperate with such ledge 19. The unit is then slightly rotated, permitting the elevating supporting structure 18 to support the unit in an elevated position above the platform 16 (see Figs. 4 and 6) as is more fully described in the copending W. J. Russell application referred to hereinabove. It is to be understood that any other suitable elevating supporting structure may be used in lieu of the structure 18.

The operator then merely unlatches the latching device 65 upon the bottom portions 46 and 48 of pan structure 14 and moves or rotates the movable bottom portion 46 about the hinge structure 60 so that such bottom portions are bodily displaced from beneath the ring-like member 44 (see Fig. 6). The hinged bottom portions 46 and 48 may then be removed from the ring-like member 44 and element 12. The ring-like member 44 may then be freely lifted from about the element 12. The bottom portions 46 and 48 and ring-like member 44 may then be taken to a suitable dishpan and thoroughly cleaned. Likewise, while the heating unit 10 is in an elevated position and with the pan structure 14 removed therefrom, the operator may thoroughly clean the heating element 12 and terminal shield 34.

After thoroughly cleaning the unit 10, the pan structure 14 may be easily and readily positioned about the heating element 12 by placing the ring-like member 44 about the element so that it will rest upon the radially extending arms 26. With the ring-like member 44 in place about the heating element 12, the movable pin 62 associated with the hinge structure of bottom portions 46 and 47 may be located about the hinge structure 60 so as to cooperatively engage the member 44 through keys 66. The movable bottom portions 46 and 48 then cooperate with the ring-like member 44 and are retained in such cooperation by means of the latching member 64 and keying members 66, as hereinabove described.

The unit 10 may then be returned to its normal operating position upon the range platform, whereupon the overhanging lip portion 54 of the flange-like member 44 will retain the unit 10 in its normal operating position upon such platform. The radially extending arms 26 then cooperate with the lugs 56 to support the heating element 12 and to bind the unit into a functionally integral structure.

The bottom portions 46 and 48 may, if desired, be separate members and need not be hinged together provided there be suitable keying or latching means such as keys 80 (see Figs. 7 and 8) between the ring-like member 44 and the bottom portions 46 and 48, whereby such portions will be retained in a functionally integral engagement therewith when the unit is in its normal operating position. The inwardly extending keying members 80 are located at the so-called hinge end of the half pan portions 46 and 48 and are rigidly attached to or integral with the side walls of such half pan portions. The keys 80 cooperate with suitable apertures 82 in the depending sides 52 of the ring-like member 44. The cooperation of keys 80 within apertures 82 permits such keys to function as fulcruming members.

Accordingly, the half-pan bottom portions 46 and 48 may hinge or rotate about such pins when the pins 80 are positioned in cooperation with the apertures 82 in the ring-like member 44. The bottom portions 46 and 48 are each independently removable from the ring-like member 44 and are not directly connected together. This structure permits the bottom portions 46 and 48 to be located about the ring-like member 44 and heating element 12, and to be latched together by the latching means 65, as hereinabove described, and to be individually removed from the ring-like member 44 when it is desired to remove the pan structure 14 from the heating element for suitable cleaning purposes.

Various other modifications may be made in the device embodying my invention without departing from the spirit and scope thereof, and I desire, therefore, that only such limitations shall be placed thereon as are imposed by the prior art and the appended claims.

I claim as my invention:

1. In a heating structure for assembly to a platform, the combination of a heating element having a cooking surface disposed substantially in the plane of the platform during normal periods of operation and movable to an elevated position above the platform at other times, said element having a terminal structure depending therefrom, a circular member having an outwardly-extending flange resting upon the platform and disposed peripherally of the heating element and a sleeve depending from the flange, first and second relatively movable bottom wall portions defining a pan structure beneath the element and disposed on opposite sides of the terminal structure, said pan structure defining a heat reflector and a terminal shield and said pan structure being separable from the circular sleeve member, hinge means connecting said bottom wall portions, means for latching said bottom portions together about the depending sleeve of the circular member, and means carried by the bottom wall portions for defining a support for said element in its normal operating position.

2. In a heating structure for assembly to a platform, the combination of a heating element having its cooking surface arranged in a substantially horizontal plane near the plane of the platform during normal operation and movable manually to an elevated position above the platform for cleaning, a terminal structure depending from the heating element, a plurality of outwardly-extending supporting arms attached to the element, a ring supported by said platform and disposed about the element, said ring including a depending sleeve provided with a plurality of upwardly-extending notches in the lower edge thereof, a pair of complementary bottom pan members disposed on opposite sides of the terminal structure, hinge means connecting the pan members so that they are movable with respect to each other, said pan members having upstanding walls which have substantially the same configuration as said sleeve, means for locking the bottom pan members together and about said sleeve and a plurality of inwardly-extending lugs carried by the upstanding walls of the pan members and fitting within said notches for receiving the outer ends of said supporting arms.

3. In a heating structure for assembly to a platform, the combination of a heating element having a substantially circular cooking surface normally disposed adjacent the plane of the platform and including a diametrically-extending depending terminal portion, said element and terminal portion being movable to an elevated position for cleaning, an annular member having an outwardly-extending flange resting upon the platform and a sleeve depending from the flange, said sleeve having a plurality of circumferentially spaced openings therein, a pair of substantially semi-circular bottom pan members disposed on opposite sides of said terminal portion and having upwardly-extending walls defining an annular rim encompassing said sleeve, circumferentially-spaced supports carried by the walls and extending through said openings for supporting the heating element and its terminal portion during normal use, hinge means connecting the walls of the pan members at one side thereof and a latch connecting the pan members at another side thereof.

4. In a heating structure for assembly to a range platform, the combination of a substantially circular heating element disposed adjacent the plane of the platform and including a diametrically-extending terminal portion depending therefrom, a plurality of radially-extending arms fixed to the element and having notches formed therein, a continuous ring resting upon the platform and having a depending sleeve formed with circumferentially-spaced recesses in the lower edge thereof, a pair of substantially semi-circular pan members disposed on opposite sides of said terminal portion and defining a generally circular pan beneath the element, said pan members having upstanding complementary walls encompassing said sleeve, a plurality of lugs projecting through said recesses, and carried by said upstanding walls for receiving and supporting said arms, a hinge connecting said pan members, a latch for retaining the pan members in position adjacent the terminal portion of said element, and means for locking the pan members to the sleeve when in its latched position.

PAUL W. GREEN.